US 12,351,063 B2

(12) United States Patent
Bennett et al.

(10) Patent No.: US 12,351,063 B2
(45) Date of Patent: Jul. 8, 2025

(54) SYSTEMS AND METHODS FOR VEHICLE-TO-LOAD CHARGING SESSION INITIALIZING, COMMUNICATING, AND CHARGING

(71) Applicant: Rivian IP Holdings, LLC, Plymouth, MI (US)

(72) Inventors: Tyler J. Bennett, Long Beach, CA (US); Jason R. Seely, Troy, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 632 days.

(21) Appl. No.: 17/634,399

(22) PCT Filed: Sep. 20, 2021

(86) PCT No.: PCT/US2021/051126
§ 371 (c)(1),
(2) Date: Feb. 10, 2022

(87) PCT Pub. No.: WO2022/061241
PCT Pub. Date: Mar. 24, 2022

(65) Prior Publication Data
US 2023/0356621 A1    Nov. 9, 2023

Related U.S. Application Data

(60) Provisional application No. 63/080,026, filed on Sep. 18, 2020.

(51) Int. Cl.
*B60L 55/00*    (2019.01)
*B60L 3/00*    (2019.01)
(Continued)

(52) U.S. Cl.
CPC ............. *B60L 55/00* (2019.02); *B60L 3/0069* (2013.01); *B60L 53/11* (2019.02); *B60L 53/16* (2019.02);
(Continued)

(58) Field of Classification Search
CPC ........ B60L 55/00; B60L 3/0069; B60L 53/11; B60L 53/16; B60L 53/62; B60L 2210/14;
(Continued)

(56) References Cited

U.S. PATENT DOCUMENTS

| 8,520,695 B1 * | 8/2013 | Rubin | .................. H04W 72/30 |
| | | | 370/445 |
| 9,114,716 B2 * | 8/2015 | Loftus | ..................... B60L 53/18 |

(Continued)

FOREIGN PATENT DOCUMENTS

| CA | 3185446 A1 | 12/2019 |
| CN | 102656766 A | 9/2012 |

(Continued)

OTHER PUBLICATIONS

Dec. 15, 2021 International Search Report and Written Opinion for International Patent Application No. PCT/US2021/051126.
(Continued)

*Primary Examiner* — Stacy Whitmore
(74) *Attorney, Agent, or Firm* — Foley & Lardner LLP

(57) ABSTRACT

Various disclosed embodiments include illustrative non-transitory computer-readable media for controllers for vehicle-to-load (V2X) charging devices, controllers for V2X charging devices, and V2X charging devices. In an illustrative embodiment, non-transitory computer-readable media store therein computer-executable instructions that, when executed on a processor, are configured to cause the processor to: establish that a protocol to be followed in a charging session is a V2X charging session from a donor (Continued)

vehicle; initialize the V2X charging session from the donor vehicle; perform an isolation check of a V2X charging device from the donor vehicle; and pre-charge the V2X charging device.

20 Claims, 6 Drawing Sheets

(51) Int. Cl.
    *B60L 53/10* (2019.01)
    *B60L 53/16* (2019.01)
    *B60L 53/62* (2019.01)
    *H02J 3/32* (2006.01)
    *H02J 7/00* (2006.01)
    *H04W 4/44* (2018.01)
    *H04W 4/46* (2018.01)

(52) U.S. Cl.
    CPC .............. *B60L 53/62* (2019.02); *H02J 3/322* (2020.01); *H02J 7/0063* (2013.01); *H04W 4/44* (2018.02); *H04W 4/46* (2018.02); *B60L 2210/14* (2013.01)

(58) Field of Classification Search
    CPC ......... H02J 3/322; H02J 7/0063; H04W 4/44; H04W 4/46; Y02T 10/70; Y02T 10/7072; Y02T 10/72; Y02T 90/12; Y02T 90/14; Y02T 90/16
    See application file for complete search history.

(56) References Cited

U.S. PATENT DOCUMENTS

| | | | |
|---|---|---|---|
| 9,821,669 B2* | 11/2017 | Tanabe | B60L 53/305 |
| 11,077,760 B2* | 8/2021 | Fong | B60L 53/305 |
| 11,104,244 B2* | 8/2021 | Mackenzie | H02J 7/342 |
| 11,260,759 B2* | 3/2022 | Zhou | B60L 53/16 |
| 12,103,410 B1* | 10/2024 | Booth | B60L 53/62 |
| 2008/0304292 A1 | 12/2008 | Zeng et al. | |
| 2012/0005031 A1* | 1/2012 | Jammer | B60L 53/30 |
| | | | 705/16 |
| 2013/0020993 A1* | 1/2013 | Taddeo | B60L 53/65 |
| | | | 320/109 |
| 2013/0175973 A1* | 7/2013 | Jones | B60L 3/12 |
| | | | 320/105 |
| 2013/0279392 A1* | 10/2013 | Rubin | H04W 4/12 |
| | | | 370/312 |
| 2014/0184141 A1* | 7/2014 | Loftus | B60L 53/65 |
| | | | 320/104 |
| 2014/0191568 A1* | 7/2014 | Partovi | H02J 50/80 |
| | | | 307/31 |
| 2015/0217656 A1 | 8/2015 | Loftus et al. | |
| 2015/0256003 A1 | 9/2015 | Yonetani | |
| 2016/0288664 A1 | 10/2016 | Biagini et al. | |
| 2017/0352200 A1* | 12/2017 | Wang | H04W 4/023 |
| 2019/0001833 A1 | 1/2019 | Coburn | |
| 2019/0047427 A1* | 2/2019 | Pogorelik | G06Q 20/405 |
| 2019/0165591 A1 | 5/2019 | Kisacikoglu et al. | |
| 2020/0282859 A1 | 9/2020 | Shin | |
| 2020/0324665 A1* | 10/2020 | Mackenzie | B60L 53/22 |
| 2021/0224056 A1* | 7/2021 | John | H04W 4/46 |
| 2022/0291678 A1* | 9/2022 | El Essaili | H04W 4/40 |
| 2024/0303118 A1* | 9/2024 | Gulati | H04W 4/44 |
| 2024/0319724 A1* | 9/2024 | Zahid | G07C 5/008 |
| 2024/0348079 A1* | 10/2024 | Oya | H02J 7/007182 |

FOREIGN PATENT DOCUMENTS

| | | |
|---|---|---|
| CN | 103439577 A | 12/2013 |
| CN | 108206570 A | 6/2018 |
| CN | 209250513 U | 8/2019 |
| CN | 110406425 A | 11/2019 |
| CN | 111231699 A | 6/2020 |
| CN | 211493678 U | 9/2020 |
| JP | 2007-267561 A1 | 10/2007 |
| WO | WO-2012/078921 A2 | 6/2012 |
| WO | WO-2015/036063 A1 | 3/2015 |

OTHER PUBLICATIONS

Office Action and Search Report on CN Appl. No. 2021800333525 dated Apr. 18, 2025, with machine translation, Guo Hao.
Office Action on CN Appl. No. 202180036854.3 dated Mar. 13, 2025, with machine translation, Wang.
Non-Final Office Action on U.S. Appl. No. 17/761,022 dated May 8, 2025, Schulz.

* cited by examiner

SYSTEMS AND METHODS FOR VEHICLE-TO-LOAD CHARGING SESSION INITIALIZING, COMMUNICATING, AND CHARGING

CROSS-REFERENCE TO RELATED APPLICATION

The present disclosure claims the benefit of priority of co-pending International Application No. PCT/US21/51126, filed on Sep. 20, 2021, and entitled "SYSTEMS AND METHODS FOR VEHICLE-TO-LOAD CHARGING SESSION INITIALIZING, COMMUNICATING, AND CHARGING," which claims priority to U.S. Provisional Patent Application No. 63/080,026, filed on Sep. 18, 2020, and entitled "SYSTEMS AND METHODS FOR PERFORMING VEHICLE-TO-LOAD CHARGING," the contents of which are incorporated in full by reference herein.

INTRODUCTION

The present disclosure relates to charging by electrical vehicles.

A direct current (DC) fast charging (DCFC) station may provide DC electrical power to an electric vehicle to charge the electric vehicle's high voltage battery. Communicating, setting up, and initializing a charge session to transfer energy from a DCFC charging station to an electric vehicle is addressed by standard DIN 70121.

An electric vehicle can transfer energy as a source of DC electrical power to a load device (known as vehicle-to-load (V2X) charging) through a V2X device that includes a DC/DC power converter. A V2X charging session should appear to the recipient (that is, the load) as if charging is from a DC fast charging station. However, communicating, setting up, and initializing a charge session to transfer energy from an electric vehicle as a source of DC electrical power to a load device for a V2X charging session is not addressed by any currently-known standard.

The statements in this section merely provide background information related to the present disclosure and may not constitute prior art.

BRIEF SUMMARY

Various disclosed embodiments include illustrative non-transitory computer-readable media for controllers for V2X charging devices, controllers for V2X charging devices, and V2X charging devices. Thus, various disclosed embodiments provide illustrative systems and methods for initializing, communicating, and charging a recipient load from a donor vehicle in a V2X charging session.

In an illustrative embodiment, non-transitory computer-readable media store therein computer-executable instructions that, when executed on a processor, are configured to cause the processor to: establish that a protocol to be followed in a charging session is a vehicle-to-load (V2X) charging session from a donor vehicle; initialize the V2X charging session from the donor vehicle; perform an isolation check of a V2X charging device from the donor vehicle; and pre-charge the V2X charging device.

In another illustrative embodiment, a controller includes a processor and non-transitory computer-readable media storing therein computer-executable instructions that, when executed on the processor, are configured to cause the processor to: establish that a protocol to be followed in a charging session is a V2X charging session from a donor vehicle; initialize the V2X charging session from the donor vehicle; perform an isolation check of a V2X charging device from the donor vehicle; and pre-charge the V2X charging device.

In another illustrative embodiment, a V2X charging device includes a high voltage direct current (DC)-DC converter, a DC bus charge module, and a controller. The controller includes a processor and non-transitory computer-readable media storing therein computer-executable instructions that, when executed on the processor, are configured to cause the processor to: establish that a protocol to be followed in a charging session is a V2X charging session from a donor vehicle; initialize the V2X charging session from the donor vehicle; cause the DC bus charge module to perform an isolation check of the V2X charging device from the donor vehicle; and cause the DC bus charge module to pre-charge the DC-DC converter.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1A:
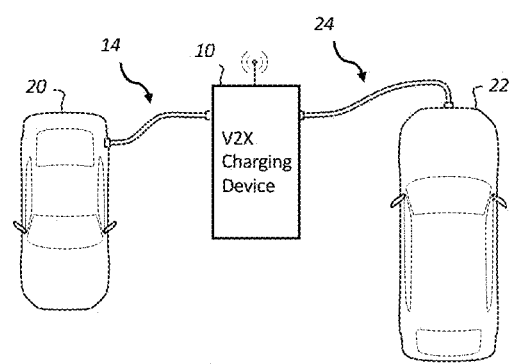
FIG. 1A is a block diagram in partial schematic form of an illustrative vehicle-to-load (V2X) charging device, a donor vehicle, and a recipient load.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Given by way of overview, various disclosed embodiments include illustrative non-transitory computer-readable media for controllers for V2X charging devices, controllers for V2X charging devices, and V2X charging devices. Thus, various disclosed embodiments provide illustrative systems and methods for initializing, communicating, and charging a recipient load from a donor vehicle in a V2X charging session.

Figure 1B:
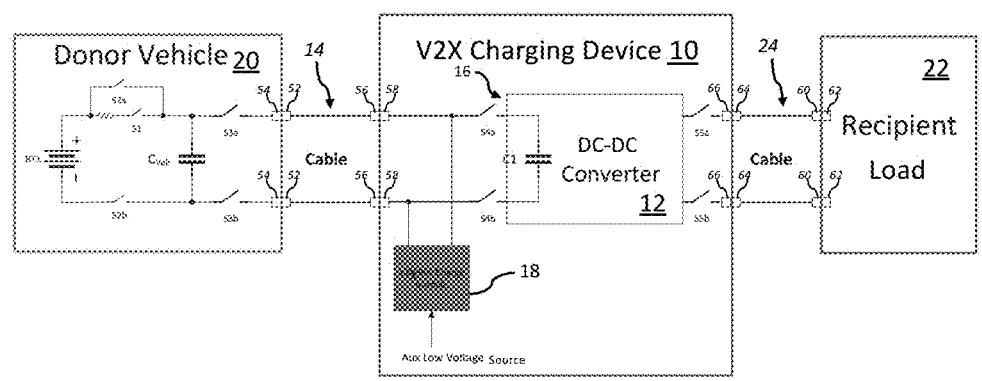
FIG. 1B is a block diagram of the V2X charging device of FIG. 1A.
Figure 1C:
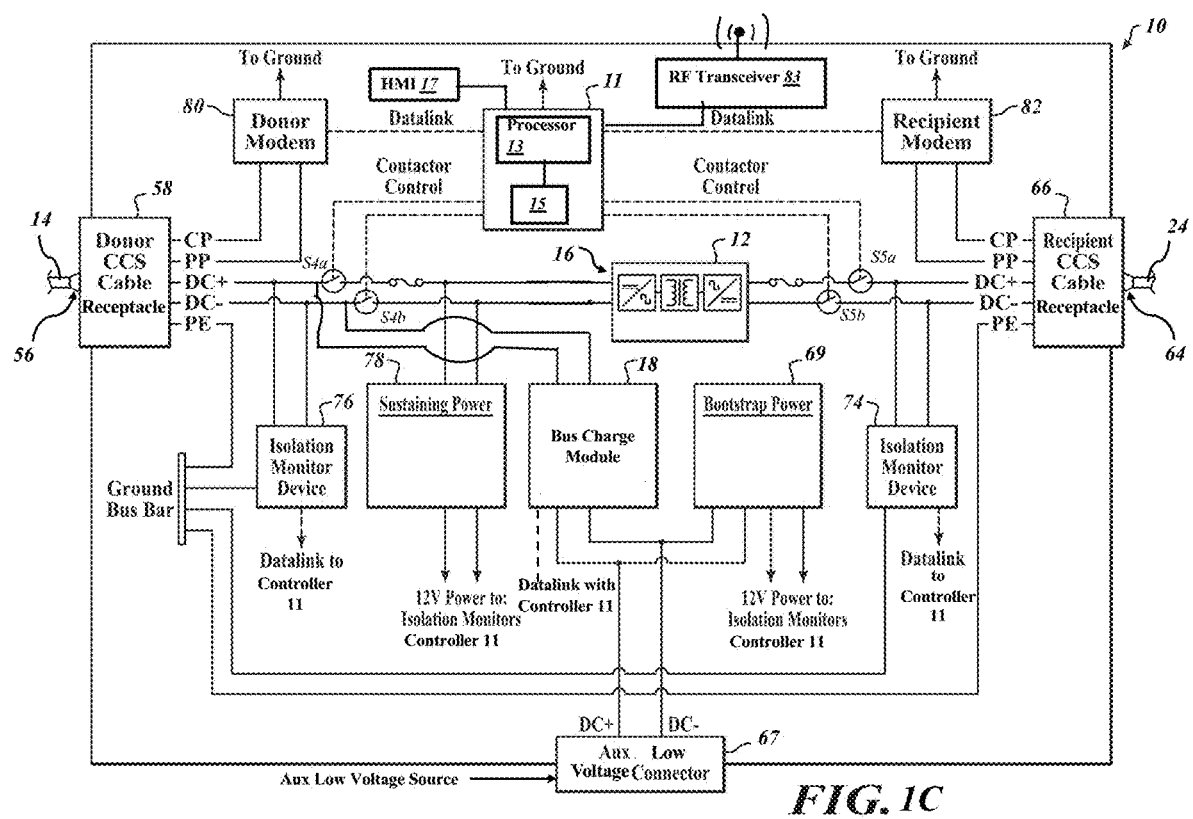
FIG. 1C is a block diagram of details of the V2X charging device of FIGS. 1A and 1B.

Still by way of overview and referring to FIGS. 1A-1C, an illustrative vehicle-to-load (V2X) charging device 10 includes a high voltage direct current (DC)-DC converter 12

(FIGS. 1B and 1C), a DC bus charge module 18 (FIGS. 1B AND 1C), and a controller 11. The controller 11 includes a processor 13 and non-transitory computer-readable media 15 storing therein computer-executable instructions that, when executed on the processor 13, are configured to cause the processor 13 to; establish that a protocol to be followed in a charging session is a V2X charging session from a donor vehicle 20 (FIGS. 1A and 1B); initialize the V2X charging session from the donor vehicle 20; cause the DC bus charge module 18 to perform an isolation check of the V2X charging device 10 from the donor vehicle 20; and cause the DC bus charge module 18 to pre-charge the DC-DC converter 12. A human-machine interface (HMI) 17, such as a control and display panel or the like, is operatively coupled to the controller 11.

Still by way of non-limiting overview, it will be appreciated that various embodiments can help permit a V2X charging device (such as without limitation the V2X charging device 10) and a donor vehicle (such as without limitation the donor vehicle 20) to function (as a composite unit) as an equivalent to a DC fast charging (DCFC) station.

Now that an overview has been given by way of non-limiting overview, details of various disclosed embodiments will be set forth below by way of non-limiting examples given by way of illustration only and not of limitation.

Illustrative V2X charging devices will be described first by way of non-limiting examples given by way of illustration only and not of limitation. After the illustrative V2X charging devices have been described, illustrative processes for controlling a V2X charging session will be described.

Still referring to FIGS. 1A-1C, in various embodiments the illustrative V2X charging device 10 includes the high voltage DC-DC converter 12, an electrical charge storage device C1 electrically connectable to the input 16 of the DC-DC converter 12, and the DC bus charge module 18. In various embodiments the DC bus charge module 18 includes any suitable DC boost converter as desired for a particular application, such as, for example and without limitation, a flyback converter or the like. An explanation of details of construction and operation of a DC boost converter is not necessary for a person of skill in the art to understand disclosed subject matter.

The DC bus charge module 18 is configured to: apply an output DC voltage from the DC bus charge module 18 and having a first voltage level to a DC bus cable 14 electrically connectable to the input 16 of the DC-DC converter 12 with the DC bus cable 14 disconnected from a first DC voltage source BT1; and charge the electrical charge storage device C1 with an output DC voltage from the DC bus charge module 18 and having a second voltage level that is different from the first voltage level with the DC bus cable 14 disconnected from the first DC voltage source BT1.

It will be appreciated that, in various embodiments, insulation of the DC bus cable 14 can be verified without the DC bus cable 14 being electrically connected to the first DC voltage source BT1 (such as a high voltage DC electrical battery of the donor vehicle 20) and that, in various embodiments, the DC-DC converter 12 can be pre-charged without the DC bus cable 14 being electrically connected to the first DC voltage source BT1.

It will be appreciated that V2X charging sessions associated with various disclosed embodiments entail use of the V2X charging device 10 that is interposed between the donor vehicle 20 and a recipient load 22. As shown in FIGS. 1A and 1B, the illustrative V2X charging device 10 (sometimes referred to as "V2X Equipment" and/or "V2 V Equipment") includes the DC-DC converter 12. The DC bus cable 14 is configured to electrically connect the V2X charging device 10 with the donor vehicle 20 and a cable 24 electrically connects the V2X charging device 10 with the recipient load 22.

In various embodiments the DC bus cable 14 and the cable 24 include any suitable cables configured to distribute high voltage DC electrical power (such as on the order of around 450 V or so). Because the DC bus cable 14 is configured to distribute high voltage DC electrical power from the donor vehicle 20, in various embodiments the DC bus cable 14 includes a suitable connector configured to electrically connect the DC bus cable 14 to the V2X charging device 10. In various embodiments, such a suitable connector may include, without limitation, a combined charging system (CCS) Type 1 and/or Type 2 coupler, a CHAdeMo coupler, a GB/T coupler, a Tesla connector, and/or the like. In various embodiments, the cable 24 also includes a suitable connector configured to electrically connect the cable 24 to the V2X charging device 10. In various embodiments, such a suitable connector also may include, without limitation, a combined charging system (CCS) Type 1 and/or Type 2 coupler, a CHAdeMo coupler, a GB/T coupler, a Tesla connector, and/or the like.

In various embodiments the V2X charging device 10 includes switches S4a and S4b that are interposed between input terminals of the DC-DC converter 12 and the DC bus cable 14 and switches Sa and S5b that are interposed between output terminals of the DC-DC converter 12 and the cable 24. The DC-DC converter 12 adjusts DC voltage level of DC electrical power supplied by the donor vehicle 20 as desired for charging the recipient load 22. That is, the DC-DC converter 12 can increase and/or decrease the DC voltage of the electrical energy supplied from the donor vehicle 20 to match operating voltage of the recipient load 22.

It will be appreciated that, in various embodiments and as will be described below, the recipient load 22 can communicate charge limits, voltage limits, and/or charge status so that the V2X charging device 10 can take desired actions to help contribute to effecting safe energy transfer, such as, for example, asking the donor vehicle 20 to close contractors (such as, for example, switches S3a and S3b) for energy transfer, looking for faults on the donor vehicle 20 or the recipient load 22, or the like.

While the V2X charging device 10 may be referred to as "V2 V Equipment" and the recipient load 22 may be referred to as a "Recipient Vehicle," it will be appreciated that the recipient load 22 is not limited to a vehicle but may be any load whatsoever as desired, a battery or a bank of batteries, any suitable energy storage device such as a capacitor or a bank of capacitors, an energy storage system with batteries, and/or an energy storage system with solar cells with associated electronics, or the like.

In various embodiments the V2X charging device 10 includes the high voltage direct current DC-DC converter 12. The DC bus cable 14 is electrically connectable to the input 16 of the DC-DC converter 12. The electrical charge storage device C1 is electrically connectable to the input 16 of the DC-DC converter 12. The DC bus charge module 18 is configured to: apply an output DC voltage from the DC bus charge module 18 and having a first voltage level to the DC bus cable 14 with the DC bus cable 14 disconnected from the DC voltage source BT1; and charge the electrical charge storage device C1 with an output DC voltage from the DC bus charge module 18 and having a second voltage level that is different from the first voltage level with the DC bus cable 14 disconnected from the DC voltage source BT1.

In various embodiments the DC-DC converter 12 converts input DC voltage from the DC voltage source BT1 of the donor vehicle to a requested output DC voltage that is provided to the recipient load 22. The DC-DC converter 12 is any suitable DC-DC converter as desired for a particular application. An explanation of details of construction and operation of the DC-DC converter 12 is not necessary for a person of skill in the art to understand disclosed subject matter.

In various embodiments, the DC-DC converter 12 includes the electrical charge storage device C1, and the electrical charge storage device C1 is electrically connected within the DC-DC converter 12 across terminals of the input 16 of the DC-DC converter 12. In some embodiments, the electrical charge storage device C1 may be provided separately from the DC-DC converter 12. In such embodiments, the electrical charge storage device C1 is electrically connected across the terminals of the input 16 of the DC-DC converter 12 between the switches S4a and S4b and the terminals of the input 16 of the DC-DC converter 12.

Regardless of location of the electrical charge storage device C1, as discussed herein, the electrical charge storage device C1 is charged by the DC bus charge module 18 to the DC voltage of the DC voltage source BT1 before the DC voltage source BT1 is electrically connected to the DC-DC converter 12. Thus, with the electrical charge storage device C1 charged to the DC voltage of the DC voltage source BT1, the input 16 of the DC-DC converter 12 is already at the DC voltage level of the DC voltage source BT1 when the DC voltage source BT1 is electrically connected to the V2X charging device 10. The electrical charge storage device C1 is any suitable electric charge storage device as desired, such as a capacitor or the like.

In various embodiments the DC boost converter 26 is configured to receive an input DC voltage from any suitable DC voltage source such as, without limitation, an auxiliary low voltage source, a DC power supply (such as those that convert alternating current (AC) electrical power, light, heat, or the like, to DC electrical power), an electrical battery (rechargeable or single use) or electrical batteries (rechargeable or single use), an electrical or electronic device that can supply DC electrical power, or the like. The input DC voltage has a voltage level that is less than the voltage levels of the output DC voltages of the DC boost converter (that is, the first voltage level and the second voltage level). The input DC voltage may have any suitable voltage level whatsoever as desired for a particular application. For example, in some embodiments the input DC voltage may be 12 V. In some other embodiments, the input DC voltage may be 4 V or, in some cases, 3.65 V. However, it is emphasized that the input DC voltage may have any suitable voltage level whatsoever as desired for a particular application.

The DC boost converter 26 is configured to convert the input DC voltage to the output DC voltage (which has voltage levels greater than the input DC voltage). In various embodiments, the DC boost converter 26 converts the input DC voltage to an output DC voltage with a voltage level of around 500 V to be applied to the DC bus cable 14 (before the switches s4a and s4b) to verify the insulation of the DC bus cable 14 (that is, for performing the isolation check). However, any output DC voltage level may be used that is suitable for verifying the insulation of the DC bus cable 14. In various embodiments, the DC boost converter 26 converts the input DC voltage to an output DC voltage with a voltage level of around 450 V to charge the electrical charge storage device C1 to the DC voltage of the DC voltage source BT1. However, any output DC voltage level may be used that corresponds to the DC voltage of the DC voltage source BT1. In various embodiments the DC boost converter 26 suitably is a flyback converter. However, it will be appreciated that the DC boost converter 26 may be any suitable boost converter as desired.

In various embodiments a connector 52 of the DC bus cable 14 (as described above) is plugged into a receptacle 54 of the donor vehicle that is electrically connectable to the DC voltage source BT1. A connector 56 of the DC bus cable 14 (as described above) is plugged into a receptacle 58 of the V2X charging device 10. A connector 60 of the cable 24 is plugged into a receptacle 62 of the recipient load 22. A connector 64 of the cable 24 is plugged into a receptacle 66 of the V2X charging device 10. As described above, in various embodiments the connectors 52, 56, 60, and 64 and the receptacles 54, 58, 62, and 66 may include, without limitation, combined charging system (CCS) Type 1 and/or Type 2 connectors and receptacles, CHAdeMo connectors and receptacles, GB/T connectors and receptacles, Tesla connectors and receptacles, and/or the like.

As shown in FIG. 1C, in various disclosed embodiments the V2X charging device 10 may include additional components, details of which are set forth below by way of illustration only and not of limitation.

As shown in FIG. 1C, in various embodiments the V2X charging device 10 includes the donor and recipient cable receptacles 58 and 66, respectively, an auxiliary low voltage connector 67, a bootstrap power circuit 69, the bus charge module 18, and the controller 11.

In various embodiments the V2X charging device 10 also includes a communication subsystem that includes a donor vehicle communication device 80 such as a donor modem like a power line communication (PLC) chip/board, a recipient vehicle communication device 82 such as a recipient modem like a power line communication (PLC) chip/board, and/or a radio-frequency (RF) transceiver 83 such as a WiFi chip/board and/or a Bluetooth chip/board. In such embodiments, the donor vehicle communication device 80, the recipient vehicle communication device 82, and the RF transceiver 83 are communicable electrically with the donor vehicle 20 and the recipient load 22, respectively, responsive to the controller 11. The communication subsystem may be communicable electrically with the donor vehicle 20 and the recipient load 22 via power line communication (PLC) and/or wireless communication for high-level communication and via a control pilot CP for low-level communication. In various embodiments the V2X charging device 10 also includes isolation monitoring devices 74 and 76 and the DC-DC converter 12.

In various embodiments an auxiliary low voltage source is electrically connectable to a low voltage connector 67. The donor vehicle 20 and the recipient load 22, respectively, are connected to the V2X charging device 10 via the cable receptacles 58 and 66, respectively. In various embodiments the voltage supplied by the auxiliary low voltage source charges initial startup components (such as, for example, the controller 11, the isolation monitoring devices 74 and 76, the donor vehicle communication device 80, and the recipient vehicle communication device 82) of the V2X charging device 10 via the bootstrap power circuit 69. For example, in various embodiments the auxiliary low voltage source may provide an approximately 4 V (in some embodiments, 3.65 V) DC voltage up to an approximately 12 V DC voltage to the bootstrap power circuit 69 and to the bus charge module 18. The bootstrap power circuit 69 creates a 12 V operational voltage from the voltage of the auxiliary low voltage source. The bus charge module 18 creates an insulation check voltage of around 500 V DC and a pre-charge voltage of around 400 V-450 V DC or so from the voltage of the auxiliary low voltage source.

The bootstrap power circuit 69 converts a voltage output by the auxiliary low voltage source to a voltage value acceptable by the initial startup components of the V2X charging device 10. After the initial startup components have been sufficiently powered, the controller 11 instructs the bus charge module 18 to convert voltage from the auxiliary low voltage source to a value for preparing the DC-DC converter 12.

Now that the V2X charging device 10 has been described, illustrative processes (controlled by the controller 11 via the processor 13) for controlling a V2X charging session will be described.

Figure 2:
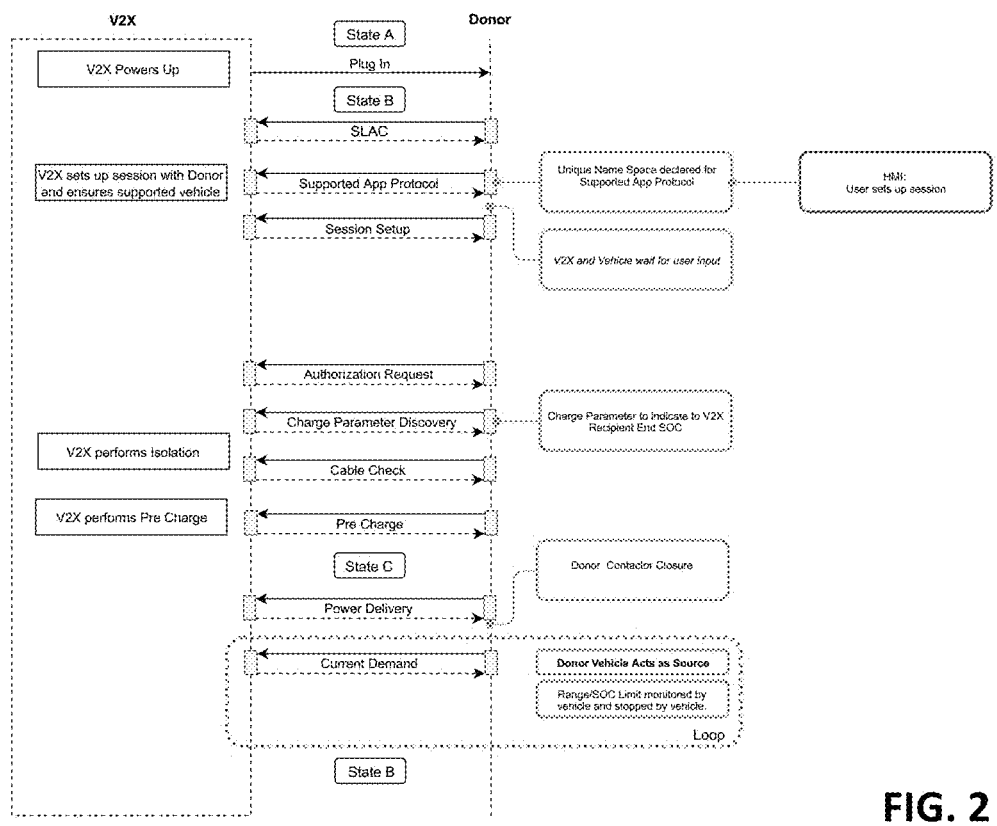
FIG. 2 is a state diagram of an illustrative method for V2X initializing, communicating, and charging.
Figure 3:
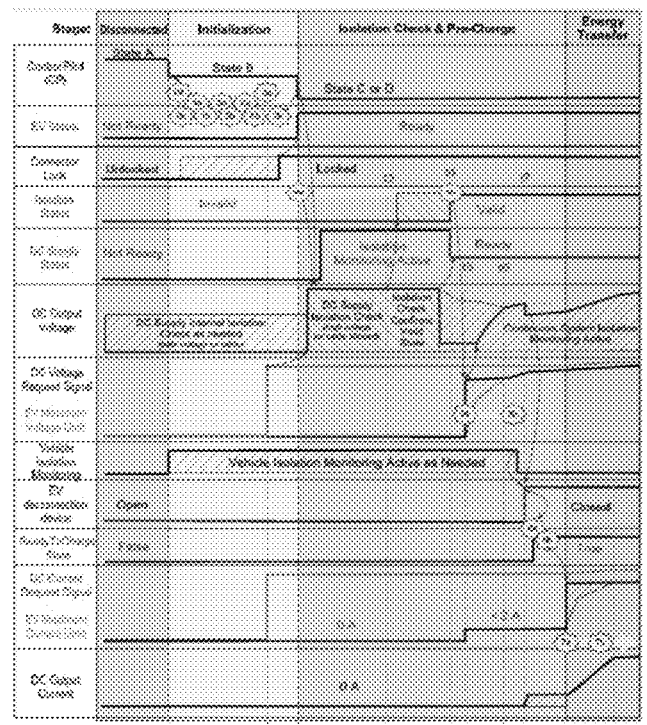
FIG. 3 is a sequence diagram of stages in an illustrative V2X charging session.

Referring additionally to FIGS. 2 and 3, in various embodiments processes for controlling a V2X charging session are described in sequence phases made with reference to control pilot (CP) states. The CP states are defined by SAE J1772.

During an unmated or disconnected sequence phase in state A (standby), with the switches s3a, s3b, s4a, and s4b open, the cable 14 is connected to the donor vehicle 20 via the connector 52 (such as a CCS connector) and the receptacle 54 (such as a CCS receptacle) and to the V2X charging device 10 via the connector 56 (such as a CCS connector) and the receptacle 58 (such as a CCS receptacle). With the switches s5a and s5b open, the cable 24 is connected to the recipient load 22 via the connector 60 (such as a CCS connector) and the receptacle 62 (such as a CCS receptacle) and to the V2X charging device 10 via the connector 64 (such as a CCS connector) and the receptacle 66 (such as a CCS receptacle).

Upon the cable 14 being plugged into the donor vehicle 20 and the V2X charging device 10, the CP state changes from state A (standby) to state B (vehicle detected). Various processes are performed during an initialization sequence phase in state B.

A signal line attenuation characterization (SLAC) protocol is performed to verify that the donor vehicle 20 and the V2X charging device are electrically connected to each other via the cable 14.

The controller 11 establishes that a protocol to be followed in a charging session is a vehicle-to-load (V2X) charging session from the donor vehicle 20. In various embodiments and as shown in FIG. 2, a unique name space is declared. In such embodiments, the instructions are further configured to cause the processor 13 to establish that the protocol to be followed in a charging session is a V2X charging session from the donor vehicle 20 responsive to recognizing the name space of a supported vehicle. The name space indicates that the protocol to be followed is that of charge going from a vehicle (that is, the donor vehicle 20) and not that of a standard protocol of charge going into the vehicle. Using this name space, the donor vehicle 20 is able to recognize that a V2X charging session of charge going from the donor vehicle 20 is being initialized.

After the name space is declared, the V2X charging device 10 waits for a response from the donor vehicle 20 and the donor vehicle 20 waits for user input (or some other authorization) to set up the charging session. For example, in some embodiments authorization to set up the charging session may be provided from, for example and without limitation, a technician or other authorized user, an offsite server, or the like.

A user provides input via a human-machine interface (HMI)—such as the HMI 17 of the V2X charging device 10, an infotainment system of the donor vehicle 20, a light on a charge port, or the like, and the V2X charging device 10 initializes the V2X charging session from the donor vehicle 20. In various embodiments the instructions are further configured to cause the processor 13 to initialize the V2X charging session from the donor vehicle 20 via high level communication between the V2X charging device 10 and the donor vehicle 20 via power line communication (PCL) via the communication device 80 or wireless communication such as WiFi or Bluetooth via the RF transceiver 83.

A user may input any desired parameters of the charge. In various embodiments the instructions are further configured to cause the processor 13 to initialize the V2X charging session from the donor vehicle 20 responsive to at least one donor vehicle parameter such as an end range of the donor vehicle 20, a charging time period, and/or an amount of energy transferred from the donor vehicle 20. For example, in some embodiments the donor vehicle 20 may set an end range for the donor vehicle 20 as a default parameter for energy transfer. In some such embodiments, the end range may be set to a range needed to complete a route (if a route has been entered), distance to the nearest DC fast charging station, or a default value to ensure the user has enough range based upon user settings. As another example, a user may input an amount of energy in KW-Hrs or the like. However, it will be appreciated that any parameter of the charge whatsoever may be entered as desired.

A user may also set a desired end state of charge (SOC) for the recipient load 22 if the V2X equipment is transferring power to an energy storage system. In such embodiments the instructions are further configured to cause the processor 13 to initialize the V2X charging session from the donor vehicle 20 responsive to an end SOC for the recipient load 22.

In various embodiments, charge parameters may be based, at least in part, on one or more parameters of one or more planned additional recipient loads 22. For example, if the donor vehicle 20 is configured to transfer energy to multiple recipient loads 22 (for example, if the donor vehicle 20 is a rescue vehicle configured to provide energy to multiple recipient loads 22 in a single trip), then the donor vehicle 20 may set an end range for the donor vehicle 20 and an amount of energy allotted to the additional planned recipient loads 22 as a default parameter for energy transfer, where the amount of energy allotted to the additional planned recipient loads 22 may be communicated to the donor vehicle 20 from the additional planned recipient loads 22, such as, for example, via cloud-based communication or the like.

In various embodiments, as part of initializing the V2X charging session, the charge parameters are discovered. That is, the user selection of charge parameters discussed above are sent to the V2X device 10. It will be appreciated that high level communication messages in addition to the discovered charge parameters may pass limits related to discharge and charge for V2X purposes.

As shown in FIG. 2, as part of initializing the V2X charging session, in various embodiments session setup activities may be performed if desired. For example, in various embodiments session setup may include verification of payment, verification of the user or recipient load's membership in a service network, the availability of such a service network to the recipient load 22 at the recipient load's location, and the like.

After a user enters selections and the charging session is initialized, the donor vehicle 20 sends the V2X charging device 10 an end SOC for the recipient load 22 and the V2X charging device 10 monitors the donor vehicle selections.

For example, the V2X charging device may monitor current, voltage, and/or SOC to ensure adherence to selections.

After the charging session is initialized, to help ensure safety the V2X charging device begins an isolation check and pre-charges the HV bus, as is defined by DIN 70121 and as explained above. In various embodiments the instructions are further configured to cause the processor 13 to cause the bus charge module 18 to perform an isolation check of the V2X charging device 10 from the donor vehicle 20 as described above to pre-charge the V2X charging device 10 as described above.

After the isolation check and pre-charging have been completed, the bus charge module 18 output voltage goes to zero and the switches s3a, s3b, s4a, and s4b are shut and the CP state changes from state B (vehicle detected) to State C (ready).

The switches s5a and s5b are shut and energy transfer begins from the DC voltage source BT1 of the donor vehicle 10 to the recipient load 22. Thus, the donor vehicle 20 acts as a source of DC electrical power. Charging proceeds per DIN 70121.

In various embodiments the instructions are further configured to cause the processor 11 to communicate high level communication between the V2X charging device 10 and the donor vehicle 20 and/or the recipient load 22 via PCL and/or wireless communication. Thus, in various embodiments communication can be facilitated via use of inbuilt PLC chips/boards and a WiFi chip/board and/or Bluetooth chip board of the donor vehicle 20 and/or the recipient load 22. As a result, in various embodiments various communication topologies can be used.

For example, one communication topology can include wireless communication of charge parameters on the donor vehicle 20 and the recipient load 22. In such embodiments, the donor vehicle 20 and the recipient load 22 are equipped to use wireless communication protocol, such as WiFi or Bluetooth, to exchange information about charge/discharge parameters from the donor vehicle 20 and the recipient load 22 with the V2X charging device 10.

As another example, another communication topology can include wireless communication on the donor vehicle 20 and PLC/controller area network bus (PLC/CAN) on the recipient load 22. In such embodiments, the donor vehicle 20 is equipped to use wireless communication protocol such as WiFi or Bluetooth to exchange information about charge/discharge parameters with the V2X charging device 10. The recipient load 22 uses PLC charge protocols such as combined charging system (CCS). In such embodiments the V2X charging device 10 can handle both communication protocols and will arbitrate the energy transfer.

As another example, another communication topology can also include wireless communication on the donor vehicle 20 and PLC/CAN on the recipient load 22. In such embodiments the donor vehicle 20 and the recipient load 22 are equipped to use PLC charge protocols such as CCS. In such embodiments the V2X charging device 10 can handle communication on both sides and will arbitrate the energy transfer.

During energy transfer (that is, during the V2X charging session), range and SOC limits are monitored by the donor vehicle 20 and communicated to the controller 11 via PCL or wireless communication. The recipient load 22 can communicate charge limits, voltage limits, and charge status via PCL or wireless communication so that the V2X charging device 10 can take desired actions to help contribute to effecting safe energy transfer, such as asking the donor vehicle 20 to close contactors for energy transfer, looking for faults on the donor vehicle 20 or the recipient load 22, or the like. When an applicable limit is reached, the V2X charging session is stopped per DIN 70121.

Figure 4:
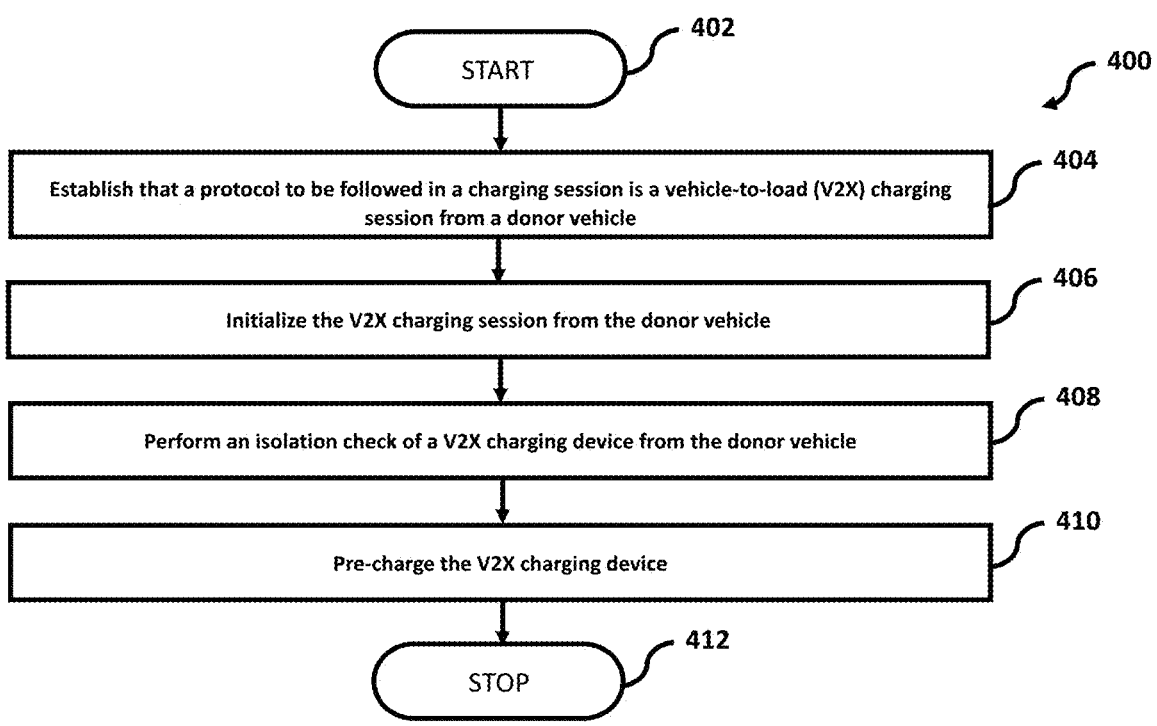
FIG. 4 is a flowchart of an illustrative V2X method.

In various embodiments and referring additionally to FIG. 4, an illustrative V2X method 400 is provided. The method 400 begins at a block 402. At a block 404 a protocol is established to be followed in a charging session that is a vehicle-to-load (V2X) charging session from a donor vehicle. At a block 406 the V2X charging session from the donor vehicle is initialized. At a block 408 an isolation check of a V2X charging device from the donor vehicle is performed. At a block 410 the V2X charging device is pre-charged. The method 400 ends at a block 412.

In various embodiments, establishing that the protocol to be followed in a charging session is a V2X charging session from a donor vehicle is responsive to recognizing a name space of a supported vehicle.

In various embodiments, the V2X charging session from the donor vehicle is initialized via high level communication between the V2X charging device and the donor vehicle via a communications protocol chosen from power line communication (PCL) and wireless communication.

In various embodiments, the V2X charging session from the donor vehicle is initialized responsive to at least one donor vehicle parameter such as an end range of the donor vehicle, a charging time period, and/or an amount of energy transferred from the donor vehicle.

In various embodiments, the V2X charging session from the donor vehicle is initialized responsive to an end state of charge for a recipient load.

In various embodiments, the V2X charging device transfers energy from the donor vehicle to a recipient load.

In various embodiments, high level communication between the V2X charging device and the donor vehicle and/or the recipient load is communicated via at least one communications protocol chosen from power line communication (PCL) and wireless communication.

It will be appreciated that various embodiments described herein can help permit establishing communication and initializing a V2X charging session through utilization of existing hardware and software already on vehicles today. It will also be appreciated that various embodiments described herein can help permit, for example and without limitation, charging of another vehicle by a donor vehicle, transferring power from a donor vehicle to a home through DC charge pins, or for support vehicles to rescue stranded vehicles without adding any extra communication hardware to the donor vehicle.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware.

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. Non-transitory computer-readable media storing therein computer-executable instructions that, when executed on a processor, are configured to cause the processor to:
    establish that a protocol to be followed in a charging session is a vehicle-to-load (V2X) charging session from a donor vehicle;
    initialize the V2X charging session from the donor vehicle;
    perform an isolation check of a V2X charging device from the donor vehicle by converting DC voltage from a first voltage level to a second voltage level for a cable connected to the V2X charging device to verify insulation of the cable; and
    pre-charge the V2X charging device.

2. The non-transitory computer-readable media of claim 1, wherein the instructions are further configured to cause the processor to:
    initialize the V2X charging session from the donor vehicle responsive to a name space declared by the donor vehicle; and
    establish that the protocol to be followed in a charging session is the V2X charging session from a donor vehicle responsive to recognizing the name space of a supported vehicle.

3. The non-transitory computer-readable media of claim 1, wherein the instructions are further configured to cause the processor to initialize the V2X charging session from the donor vehicle via high level communication between the V2X charging device and the donor vehicle via a communications protocol chosen from power line communication (PCL) and wireless communication.

4. The non-transitory computer-readable media of claim 1, wherein the instructions are further configured to cause the processor to initialize the V2X charging session from the donor vehicle responsive to at least one donor vehicle parameter chosen from an end range of the donor vehicle, a charging time period, and an amount of energy transferred from the donor vehicle.

5. The non-transitory computer-readable media of claim 1, wherein the instructions are further configured to cause the processor to initialize the V2X charging session from the donor vehicle responsive to an end state of charge for a recipient load.

6. The non-transitory computer-readable media of claim 1, wherein the instructions are further configured to cause the processor to cause the V2X charging device to transfer energy from the donor vehicle to a recipient load.

7. The non-transitory computer-readable media of claim 1, wherein the instructions are further configured to cause the processor to communicate high level communication between the V2X charging device and at least one device chosen from the donor vehicle and a recipient load via at least one communications protocol chosen from power line communication (PCL) and wireless communication.

8. A controller for a vehicle-to-load (V2X) charging device, the controller comprising:
    a processor; and non-transitory computer-readable media storing therein computer-executable instructions that, when executed on the processor, are configured to cause the processor to:

establish that a protocol to be followed in a charging session is a vehicle-to-load (V2X) charging session from a donor vehicle;

initialize the V2X charging session from the donor vehicle;

perform an isolation check of a V2X charging device from the donor vehicle by converting DC voltage from a first voltage level to a second voltage level for a cable connected to the V2X charging device to verify insulation of the cable; and pre-charge the V2X charging device.

9. The controller of claim 8, wherein the instructions are further configured to cause the processor to initialize the V2X charging session from the donor vehicle responsive to a name space declared by the donor vehicle and via high level communication between the V2X charging device and the donor vehicle via a communications protocol chosen from power line communication (PCL) and wireless communication.

10. The controller of claim 8, wherein the instructions are further configured to cause the processor to initialize the V2X charging session from the donor vehicle responsive to at least one donor vehicle parameter chosen from an end range of the donor vehicle, a charging time period, and an amount of energy transferred from the donor vehicle.

11. The controller of claim 8, wherein the instructions are further configured to cause the processor to initialize the V2X charging session from the donor vehicle responsive to an end state of charge for a recipient load.

12. The controller of claim 8, wherein the instructions are further configured to cause the processor to cause the V2X charging device to transfer energy from the donor vehicle to a recipient load.

13. The controller of claim 8, wherein the instructions are further configured to cause the processor to communicate high level communication between the V2X charging device and at least one device chosen from the donor vehicle and a recipient load via at least one communications protocol chosen from power line communication (PCL) and wireless communication.

14. A vehicle-to-load (V2X) charging device comprising:
a high voltage direct current (DC)-DC converter;
a DC bus charge module; and
a controller of a V2X charging device including:
a processor; and
non-transitory computer-readable media storing therein computer-executable instructions that, when executed on the processor, are configured to cause the processor to:

establish that a protocol to be followed in a charging session is a V2X charging session from a donor vehicle;

initialize the V2X charging session from the donor vehicle;

cause the DC bus charge module to perform an isolation check of the V2X charging device from the donor vehicle by converting DC voltage from a first voltage level to a second voltage level for a cable connected to the V2X charging device to verify insulation of the cable; and cause the DC bus charge module to pre-charge the DC-DC converter.

15. The V2X charging device of claim 14, further comprising:
a communication subsystem configured to communicate low level communication and high level communication.

16. The V2X charging device of claim 15, wherein the communication subsystem includes at least one communication device configured to communicate high level communication via power line communication (PLC) and a radio-frequency (RF) transceiver configured to communicate high level communication.

17. The V2X charging device of claim 16, wherein the RF transceiver is further configured to communicate high level communication via at least one RF communication protocol chosen from WiFi and Bluetooth.

18. The V2X charging device of claim 17, wherein the instructions are further configured to cause the processor to communicate high level communication between the V2X charging device and at least one device chosen from the donor vehicle and a recipient load via at least one communications protocol chosen from power line communication (PCL) and wireless communication.

19. The V2X charging device of claim 14, wherein the instructions are further configured to cause the processor to initialize the V2X charging session from the donor vehicle responsive to responsive to a name space declared by the donor vehicle, responsive to an end state of charge for a recipient load and responsive to at least one donor vehicle parameter chosen from an end range of the donor vehicle, a charging time period, and an amount of energy transferred from the donor vehicle.

20. The V2X charging device of claim 14, wherein the instructions are further configured to cause the processor to cause the V2X charging device to transfer energy from the donor vehicle to a recipient load.

* * * * *